United States Patent
VerMurlen

(12) 
(10) Patent No.: US 6,229,623 B1
(45) Date of Patent: May 8, 2001

(54) DIGITAL COLOR PROOFING SYSTEM

(75) Inventor: Mark E. VerMurlen, White Bear Township, Ramsey County, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 08/061,286

(22) Filed: May 14, 1993

(51) Int. Cl.⁷ ........................................ G06F 15/00
(52) U.S. Cl. ............................. 358/1.9; 358/515
(58) Field of Search ................... 395/109, 112, 395/108, 131; 358/500, 501, 515, 518, 537, 1.9, 1.13, 1.8, 527; 345/431

(56) References Cited

U.S. PATENT DOCUMENTS

| | | | |
|---|---|---|---|
| 4,963,898 | | 10/1990 | Kadowaki et al. ............... 346/157 |
| 5,029,115 | * | 7/1991 | Geraci ............................... 395/131 |
| 5,113,356 | | 5/1992 | Nickell et al. .................... 395/108 |
| 5,168,292 | * | 12/1992 | Kadowaki et al. ............... 395/109 |
| 5,185,673 | * | 2/1993 | Sobol ................................ 395/109 |
| 5,243,414 | * | 9/1993 | Dalrymple et al. .............. 358/518 |
| 5,295,236 | * | 3/1994 | Bjorge et al. .................... 395/131 |
| 5,313,570 | * | 5/1994 | Dermer et al. ................... 395/131 |

FOREIGN PATENT DOCUMENTS

| | | |
|---|---|---|
| 0 529 403 A2 | 3/1991 | (EP) . |
| 3011422 | 1/1991 | (JP) . |
| WO 92/15967 | 9/1992 | (WO) . |

OTHER PUBLICATIONS

PostScript® Language Reference Manual, Second Edition Appendix G—Document Structuring Conventions—Version 3.0 Adobe Systems Incorporated.

* cited by examiner

*Primary Examiner*—Dov Popovici
(74) *Attorney, Agent, or Firm*—Dale A. Bjorkman

(57) ABSTRACT

A process for converting black-and-white color separation information contained in PostScript software to color separation information which can drive a color output device to print at least two different colors, which process comprises determining the position of commands in the black-and-white software which define the color output for the information on one color separation, and changing the command to indicate that a color other than black is to be produced.

20 Claims, No Drawings

DIGITAL COLOR PROOFING SYSTEM

BACKGROUND OF THE INVENTION

1. Field of the Invention

The present invention relates to software for use with the PostScript language in the production of multicolor images for prepress color proofing. Black-and White PostScript files are used to generate multicolor images useful for printing.

2. Background of the Invention

One of the most difficult aspects of simulating a printed image in a prepress color proof which does not actually print images from plates is the reproduction of mechanical phenomena or events that occur on press and which affect visible characteristics of the printed image. One of the more traditional phenomena which must be simulated is "dot gain," in which the half tone dots are physically spread out during printing, so that the size of the dot on the receptor sheet is not the same size as the dot on the plate. Dot gain varies according to the size of the dot, the type of press used, and the inks used, so that a proofing system must attempt to adjust for each of these variables which affect dot gain. That is no easy task.

Another event which takes place during printing is color trapping. Color trapping is necessary in the design of almost all full color pages. Trapping is a method used in the printing industry to allow for the slight misregistration of colors that occurs on the printing press. When two dissimilar colors are printed side by side, a thin area of one color is extended into the other color. If the printing press were to misplace the one color slightly away from the other, the trapping will prevent the white paper from showing through the gap.

Printing inks are transparent, so the small area where the two colors overlap will result in a darker color. The human eye is much less sensitive to this darker area than to a white gap.

The PostScript language is conventionally used to draw the text, line work, and color areas describing a printed page in many black and white, and color printers used in the graphic arts industry as well as imagesetters which create film for printing plates or proofs to check the accuracy of the page designs.

When making film for printing plates, PostScript is quite able to reproduce the color trapping needed for high quality pages. Since a separate printing plate is needed for each color, the PostScript file will draw a complete and separate page for each color separation. Each color would be represented by a single separation page.

When making a color proof, PostScript presently is not able to reproduce the color trapping on the proof. This is because PostScript considers all colors to be opaque, not transparent. This means that where two colors are to overlap on the digital data, one color will be drawn slightly underneath another color. However, when a color is drawn in the PostScript color file over the top of the other color, the area underneath the top color will be completely obliterated in the data. Thus, even though the original data of the page has proper trapping, the user will not be able to see the trapping on the color print. A page with trapping and a page without trapping will appear identical when generated by a normal color PostScript printer.

BRIEF DESCRIPTION OF THE INVENTION

The present invention relates to the use of standard Black-and-White PostScript files to generate color images from a color printer. Standard Color PostScript files will not generate useful, proofing quality images because the software will not allow the computer generated printing of trapping in the printed image. Black-and-White PostScript, as it is presently used also will not provide color images, the data being stored as commands to print black only.

The present invention is a process in which Black-and-White PostScript software has been modified by deleting Comments in the file which indicate color definition for the data following the comment (either directly or in sequence) and inserting an alternate command which specifically defines that the color separation data is a particular color (e.g., yellow, cyan, magenta, black, fluorescent colors, metallic, white, opaque white, brown, gray, etc.).

The individual color separation pages within the PostScript file can then signal a printer, using Black-and-White PostScript, to print color images with greater quality than can be achieved with present Color PostScript files.

DETAILED DESCRIPTION OF THE INVENTION

Black-and-White PostScript software is one of the preferred page languages in the printing industry. It is used by many printers and artists to generate black-and-white images, including separations. Color separations are the data of individual colors (traditionally cyan, magenta, yellow and black) which are represented by black and white images. The color printing process has used physical color separations as masks for exposing the individual printing plates for the respective colors. With the advent of digital imaging, including digital printing and proofing, color separations are also maintained as digital files of data.

PostScript provides both Black-and-White software and Color PostScript software for use in printing images and graphics. Both are highly successful and useful programs, but which cannot produce certain effects necessary in proofing images. For example, Color PostScript, as previously shown, will not produce images that simulate the trapping that occurs in printed images. This software would therefore produce proofing images that were significantly and observably different from the printed image. This is not tolerable in a proof. The Black-and-White PostScript software could only produce black-and-white images from data and so instructed any hard copy output devices with which it was associated.

When color separation information is encoded into Black-and-White PostScript, the information is placed into the file as segmented data, that is, data which is broken up into individual portions, each representing the information of a single color. The segments (or subfiles or pages) are denoted by Comments in the software data which indicates the color represented by the following data and signals any output device to print that color. In Black-and-White PostScript, all of the Comments are for black-and-white images.

The present invention enables the use of Black-and-White PostScript, and any other black-and-white software that has solely black-and-white color directives (comments) in the program, to drive a multicolor output imaging device to produce color images. This is the first known conversion of purely black-and-white software to color image-producing capability, and it is accomplished quite simply and inexpensively to produce software that produces higher quality images than the software designed specifically for color imaging.

This invention is very valuable because it allows the user to be able to see that the color trapping is properly designed into the page in color output such as the 3M Rainbow color proof. The Rainbow color proof is able to show the color trapping because it is produced from the separation data used to make the film for the printing plates. The present invention is a method of producing a full color proof from PostScript data that would normally image multiple black and white separation pages. The practice of the present invention is particularly useful in driving proofing systems, particularly those using thermal transfer imaging processes, including both thermal dye transfer and thermal mass transfer imaging.

There are no other color printers in existence which can accept the Black-and-White PostScript separation data file and create a color print. This software manipulation and the results obtained make the 3M Rainbow color proofer unique.

The invented method involves the following steps:
1. Scan the PostScript file for "Comment" lines which denote the start of each color separation page. Since the comment lines used in the PostScript to denote the start of each color are not standardized, multiple forms of the comments are searched for to ensure compatibility with a number of different PostScript producing applications.
2. Replace the Comment line with a 3M specific "Start Color" command extension to the PostScript language which denotes the color.
3. When the 3M Start Color command is executed by the PostScript interpreter, it defines the color plane into which any following black and white drawing commands should be stored.
4. The PostScript file continues to process until all the separations for the page have been drawn into their respective color planes.
5. The software then images each of the planes to the 3M color proofer in the proper sequence to create a complete full color proof.

Examples of the commands inserted in place of the Comments on the PostScript software are as follows; Italics show the lines which have been changed.

Original PostScript Fragment Denoting Start of Black Separation
QuarkXPress__3.1 begin
mx0 setmatrix
end
%%EndSetup
QuarkXPress__3.1 begin
1 1 pen 0 setgray 0 setlinejoin
(0 0 1237 858 initclip F rc clip)kp
%%PlateColor: Black
xpbu 150 45 sp0 setscreen
xpbn
gsave 1 setgray 321 239 610 635 F rc eofill grestore
save
321 239 610 635 F rc eoclip
cps np mif
/opimtx matrix currentmatrix def matrix defaultmatrix setmatrix
%QRKImageClip: rectangle 239 627 239 916 635 916 635 627 0 0
%ALDImageFileName: HD520:Images:Vegies (small version).TIFF
%ALDImageDimensions: 828 648
%ALDImageCropRect: 0 0 551 402
%ALDImagePosition: 239 626.553 239 916 635.729 916 635.729 626.553
%%BeginObject: image
Modified PostScript Fragment
QuarkXPress__3.1 begin
mx0 setmatrix
end
%%EndSetup
QuarkXPress__3.1 begin
1 1 pen 0 setgray 0 setlinejoin
(0 0 1237 858 initclip F rc clip)kp
mmmBeginBlack
xpbu 150 45 sp0 setscreen
xpbn
gsave 1 setgray 321 239 610 635 F rc eofill grestore
save
321 239 610 635 F rc eoclip
cps np mif
/opimtx matrix currentmatrix def matrix defaultmatrix setmatrix
%QRKImageClip: rectangle 239 627 239 916 635 916 635 627 0 0
%ALDImageFileName: HD520:Images:Vegies (small version).TIFF
%ALDImageDimensions: 828 648
%ALDImageCropRect: 0 0 551 402
%ALDImagePosition: 239 626.553 239 916 635.729 916 635.729 626.553
%%BeginObject: image
Original PostScript Fragment Denoting Start of Cyan Separation
%%Page: ? 2
op
0 0 xl
1 1 pen
0 0 gm
(nc 0 0 1237 858 6 rc)kp
QuarkXPress__3.1 begin
1 1 pen 0 setgray 0 setlinejoin
(0 0 1237 858 initclip F rc clip)kp
%%PlateColor: Cyan
xpbu 150 105 sp0 setscreen
xpbn
save
321 239 610 635 F rc eoclip
cps np mif
/opimtx matrix currentmatrix def matrix defaultmatrix setmatrix
%QRKImageClip: rectangle 239 627 239 916 635 916 635 627 0 0
%ALDImageFileName: HD520:Images:Vegies (small version).TIFF
%ALDImageDimensions: 828 648
%ALDImageCropRect: 0 0 551 402
Modified PostScript Fragment
%%Page: ? 2
op
0 0 xl
1 1 pen
0 0 gm
(nc 0 0 1237 858 6 rc)kp
QuarkXPress__3.1 begin
1 1 pen 0 setgray 0 setlinejoin
(0 0 1237 858 initclip F rc clip)kp
mmmBeginCyan
xpbu 150 105 sp0 setscreen
xpbn
save
321 239 610 635 F rc eoclip
cps np mif
/opimtx matrix currentmatrix def matrix defaultmatrix setmatrix %QRKImageClip: rectangle 239 627 239 916 635 916 635 627 0 0
%ALDImageFileName: HD520:Images:Vegies (small version).TIFF
%ALDImageDimensions: 828 648
%ALDImageCropRect: 0 0 551 402
Original PostScript Fragment Denoting Start of Magenta Separation
%%Page: ? 3
op
0 0 xl
1 1 pen
0 0 gm
(nc 0 0 1237 858 6 rc)kp
QuarkXPress__3.1 begin
1 1 pen 0 setgray 0 setlinejoin
(0 0 1237 858 initclip F rc clip)kp
%%PlateColor: Magenta
xpbu 150 75 sp0 setscreen
xpbn
save
321 239 610 635 F rc eoclip
cps np mif
opimtx matrix currentmatrix def matrix defaultmatrix setmatrix
%QRKImageClip: rectangle 239 627 239 916 635 916 635 627 0 0
%ALDImageFileName: HD520:Images:Vegies (small version).TIFF
%ALDImageDimensions: 828 648
%ALDImageCropRect: 0 0 551 402
Modified PostScript Fragment
%%Page: ? 3
op
0 0 xl
1 1 pen
0 0 gm
(nc 0 0 1237 858 6 rc)kp
QuarkXPress__3.1 begin
1 1 pen 0 setgray 0 setlinejoin
(0 0 1237 858 initclip F rc clip)kp
mmmBeginMagenta
xpbu 150 75 sp0 setscreen
xpbn
save
321 239 610 635 F rc eoclip
cps np mif
/opimtx matrix currentmatrix def matrix defaultmatrix setmatrix
%QRKImageClip: rectangle 239 627 239 916 635 916 635 627 0 0
%ALDImageFileName: HD520:Images:Vegies (small version).TIFF
%ALDImageDimensions: 828 648
%ALDImageCropRect: 0 0 551 402
Original PostScript Fragment Denoting Start of Yellow Separation
%%Page: ? 4
op
0 0 xl
1 1 pen
0 0 gm
(nc 0 0 1237 858 6 rc)kp
QuarkXPress__3.1 begin
1 1 pen 0 setgray 0 setlinejoin
(0 0 1237 858 initclip F rc clip)kp
%%PlateColor: Yellow
xpbu 150 90 sp0 setscreen
xpbn
save
321 239 610 635 F rc eoclip
cps np mif
/opimtx matrix currentmatrix def matrix defaultmatrix setmatrix
%QRKImageClip: rectangle 239 627 239 916 635 916 635 627 0 0
%ALDImageFileName: HD520:Images:Vegies (small version).TIFF
%ALDImageDimensions: 828 648
%ALDImageCropRect: 0 0 551 402
Modified PostScript Fragment
%%Page: ? 4
op
0 0 xl
1 1 pen
0 0 gm
(nc 0 0 1237 858 6 rc)kp
QuarkXPress__3.1 begin
1 1 pen 0 setgray 0 setlinejoin
(0 0 1237 858 initclip F rc clip)kp
mmmBeginYellow
xpbu 150 90 sp0 setscreen
xpbn
save
321 239 610 635 F rc eoclip
cps np mif
/opimtx matrix currentmatrix def matrix defaultmatrix setmatrix
%QRKImageClip: rectangle 239 627 239 916 635 916 635 627 0 0
%ALDImageFileName: HD520:Images:Vegies (small version).TIFF
%ALDImageDimensions: 828 648
%ALDImageCropRect: 0 0 551 402

What is claimed is:

1. A process for converting black-and-white color separation information contained in Post-Script software to color separation information which can drive a color output device to print at least two different colors, said process for converting black-and-white color separation information comprises determining positions of commands in the black-and-white software which define the color output for the information on one color separation, changing at least one of the commands to indicate that a color other than black is produced, and producing color output information that will effect trapping from said black-and-white color separation information when said color output device is driven to produce a color image.

2. The process of claim 1 wherein said color other than black is produced by a thermal transfer imaging system.

3. The process of claim 1 wherein at least one of said color other than black is produced by a thermal transfer imaging process.

4. The process of claim 1 wherein said color output device is a thermal transfer color imaging printer.

5. A process for converting black-and-white color separation information in Post-Script software of at least four different colors to color separation information which can drive a color output device to print at least four different colors, said process for converting black-and-white color separation information comprises determining positions of commands in the black-and-white software which define the color output for the information on one color separation, changing at least three of the commands to indicate that a color other than black is produced, and producing color output information that will effect trapping from said black-and-white color separation information when said color output device is driven to produce a color image.

6. The process of claim 5 wherein said color output device is a thermal transfer color imaging printer.

7. The process of claim 5 in which the at least three commands are for the colors cyan, magenta and yellow to be produced.

8. The process of claim 7 wherein said color other than black is produced by a thermal transfer imaging process.

9. The process of claim 7 wherein at least one of said color other than black is produced by a thermal transfer imaging process.

10. The process of claim 5 wherein the at least three commands are for cyan, magenta, and yellow to be produced.

11. The process of claim 10 wherein at least one of said color other than black is produced by a thermal transfer imaging process.

12. The process of claim 5 wherein at least one of the commands is for a color selected from the group consisting of fluorescent color, metallic color, and white to be produced.

13. The process of claim 12 wherein at least one of said color other than black is produced by a thermal transfer imaging process.

14. The process of claim 13 wherein said color output device is a thermal transfer color imaging printer.

15. The process of claim 5 wherein said color other than black is produced by a thermal transfer imaging system.

16. A process for converting at least two pages of black-and-white color separation information for a color page contained in black-and-white Post-Script software to color separation information which can drive a color output device to print at least two different colors, said process comprises determining positions of commands in the black-and-white software which define the color output for the information on one color separation, and changing the command to indicate that a color other than black is produced and processing said black and white color separation information for at least two pages into their respective color planes of color separation information, and imaging each of the planes to said color output device in sequence to create a printed single page color image with trapping.

17. The process of claim 16 wherein said Postscript software can drive a color output device to print at least four different colors and at least three commands are changed to indicate that a color other than black is produced.

18. The process of claim 16 wherein said color output device is a thermal transfer color imaging printer.

19. A process for converting at least two pages of black-and-white color separation information for a color page contained in Post-Script software to color separation information which can drive a color output device to print at least two different colors, said process comprises determining positions of comments in the black-and-white software which define the color output for the information on one color separation, and changing the comments to indicate that a color other than black is produced and processing said black and white color separation information for said page into their respective color planes of color separation information, and imaging each of the planes to said color output device in sequence to create a printed single page color image with trapping.

20. A process for converting at least two pages of black-and-white color separation information for a color page contained in Post-Script software to color separation information which can drive a color output device to print at least two different colors, said process comprises determining positions of comments in the black-and-white software which define the color output for the information on one color separation, and changing the comments to indicate that a color other than black is produced and processing said black and white color separation information of at least three colors for said page into their respective color planes of color separation information, and imaging each of the planes to said color output device in sequence to create a printed single page color image with trapping.

* * * * *

UNITED STATES PATENT AND TRADEMARK OFFICE
CERTIFICATE OF CORRECTION

PATENT NO.    : 6,229,623 B1
DATED         : May 8, 2001
INVENTOR(S)   : VerMurlen It is certified that error appears in the above-identified patent and that said Letters Patent is hereby corrected as shown below:

Column 3,
Line 48, should be italicized.

Column 4,
Lines 7, 36 and 60, should be italicized.

Column 5,
Lines 18, 42 and 67, should be italicized.
Line 24, "opimtx" should read -- /opimtx --.

Column 6,
Line 24, should be italicized.

Signed and Sealed this

Sixth Day of August, 2002

*Attest:*

JAMES E. ROGAN
*Attesting Officer*    *Director of the United States Patent and Trademark Office*